United States Patent
Bondar

(10) Patent No.: US 9,322,637 B2
(45) Date of Patent: Apr. 26, 2016

(54) MEASURING SYSTEM

(71) Applicant: Micronas GmbH, Freiburg (DE)

(72) Inventor: Yan Bondar, Waldkirch (DE)

(73) Assignee: Micronas GmbH, Freiburg (DE)

( * ) Notice: Subject to any disclaimer, the term of this patent is extended or adjusted under 35 U.S.C. 154(b) by 88 days.

(21) Appl. No.: 14/151,391

(22) Filed: Jan. 9, 2014

(65) Prior Publication Data
US 2014/0191749 A1    Jul. 10, 2014

(30) Foreign Application Priority Data
Jan. 9, 2013 (DE) .................. 10 2013 000 166

(51) Int. Cl.
*G01B 7/30* (2006.01)
*G01D 5/14* (2006.01)
*G01P 3/487* (2006.01)

(52) U.S. Cl.
CPC ........ *G01B 7/30* (2013.01); *G01D 5/145* (2013.01); *G01P 3/487* (2013.01)

(58) Field of Classification Search
CPC .... G01R 33/0206; G01R 33/09; G01R 33/07; G01R 15/202; G01R 33/00; G01R 33/02
USPC .............. 324/207.2, 207.11, 207.13, 207.25, 324/244, 174
See application file for complete search history.

(56) References Cited

U.S. PATENT DOCUMENTS

| 4,449,191 A | 5/1984 | Mehnert |
| 4,713,654 A | 12/1987 | Sweany |
| 4,715,009 A | 12/1987 | Bohmler et al. |
| 5,428,991 A | 7/1995 | Klenk et al. |
| 6,894,487 B2 * | 5/2005 | Kunz-Vizenetz ........ 324/207.25 |
| 2011/0187351 A1 * | 8/2011 | Hunger ..................... 324/207.2 |
| 2011/0291650 A1 * | 12/2011 | Franke et al. .............. 324/251 |
| 2012/0194175 A1 * | 8/2012 | Ausserlechner ......... 324/207.14 |

FOREIGN PATENT DOCUMENTS

| DE | 30 18 496 A1 | 11/1981 |
| DE | 35 20 928 A1 | 12/1985 |
| DE | 41 09 217 A1 | 4/1992 |
| DE | 41 33 679 A1 | 4/1993 |
| DE | 10 2008 060 191 A1 | 6/2010 |
| EP | 0 188 433 B1 | 6/1989 |

* cited by examiner

*Primary Examiner* — Tung X Nguyen
*Assistant Examiner* — Neel Shah
(74) *Attorney, Agent, or Firm* — Muncy, Geissler, Olds & Lowe, P.C.

(57) ABSTRACT

A measuring system is provided that includes a magnetic field sensor array, an evaluation circuit for evaluating measurement signals of the magnetic field sensor array, and a rotatable encoder that has a mass element to change a magnetic field vector in the magnetic field sensor array. The encoder has a spring element in which the mass element is attached to the spring element. The encoder has a linear guide, and the mass element is guided in a radial direction in the linear guide such that during a rotation of the encoder the mass element can be moved by centrifugal force and the centrifugal force works against the spring force of the spring element. The magnetic field sensor array is arranged toward the encoder to measure a change, caused by the movement of the mass element, in the magnetic field vector.

13 Claims, 1 Drawing Sheet

MEASURING SYSTEM

This nonprovisional application claims priority under 35 U.S.C. §119(a) to German Patent Application No. DE 10 2013 000 166.8, which was filed in Germany on Jan. 9, 2013, and which is herein incorporated by reference.

BACKGROUND OF THE INVENTION

1. Field of the Invention

The present invention relates to a measuring system.

2. Description of the Background Art

It is known to scan the marks of an encoder disk to detect a specific position of a shaft, for example, the crankshaft or the camshaft of an internal combustion engine. The marks are indicated on the surface of the encoder disk. The encoder disk is attached to the relevant shaft and the marks are to be scanned with a stationary pickup. In this regard, in the pickup, for example, an inductive pickup, voltage pulses are induced by the marks passing by and are processed in a downstream evaluation circuit or a downstream control device, whereby the shaft rotational speed is calculated from the time intervals of the voltage pulses.

A device with which the rotational speed and the angular position of the shaft are determined in this manner is known, for example, from EP 01 88 433, which corresponds to U.S. Pat. No. 4,715,009. In this case, an encoder wheel with a plurality of angle marks is scanned and the obtained voltage is converted to a square wave voltage. The rotational speed information is obtained from the time intervals of similar angle mark edges. The angle marks must either be made very precisely, so that the intervals between similar angle mark edges are very precise, or the rotational speed can be determined only imprecisely.

DE-OS 30 18 496 discloses a method and a device for measuring an angle, in which an encoder wheel connected to a rotating shaft with a plurality of marks is scanned by a pickup, whereby to increase accuracy in a calibrating run first the intervals between the individual angle marks are measured, and said measured values are stored and taken into account in a subsequent evaluation process for measuring an angle.

DE 41 33 679 A1, which corresponds to U.S. Pat. No. 5,428,991 discloses a method for adapting mechanical tolerances of an encoder wheel, with a number of marks which are approximately equidistant and which are scanned by a pickup. The pickup supplies a pulse train whose time interval is measured and stored. The encoder wheel is connected to a rotating shaft of an internal combustion engine. A check is run whether the internal combustion engine is in the coasting mode. In a detected coasting mode, the second and the following time intervals are placed in relation to the first time interval.

An acceleration sensor is known from DE 41 09 217 A1. The acceleration sensor operates according to the spring-mass principle, whereby the weight is rotatably mounted. The restoring forces are generated by a spring, which is attached, on the one hand, to the weight and, on the other, to a holder rotationally fixed in relation to the weight. The change in position can be determined via a Hall element by a capacitive or optical method. The acceleration sensor can be provided with vibration damping, which is formed as eddy current damping or air damping. The weight is deflected proportionally to the acceleration against the action of the spring. The extent of the deflection is determined by the inert mass, the distance of the center of mass–center of rotation, and the spring constant of the spiral spring. In addition, a mechanical stop is provided which limits the deflection.

Furthermore, other acceleration sensors are known from DE 10 2998 060 191 A and DE 3520 928 A1.

SUMMARY OF THE INVENTION

It is therefore an object of the present invention to provide a measuring system that refines the conventional art.

According to an embodiment of the invention, a measuring system is formed according to the spring-mass principle.

The measuring system has a magnetic field sensor array.

The measuring system has an evaluation circuit for evaluating the measurement signals of the magnetic field sensor array.

The measuring system has a rotatable encoder.

The encoder has a mass element to change a magnetic field vector in the magnetic field sensor array.

The encoder has a spring element.

The mass element is attached to the spring element.

The encoder has a linear guide.

The mass element is guided in the radial direction in the linear guide in such a way that during the rotation of the encoder the mass element can be moved by the centrifugal force and the centrifugal force works against the spring force of the spring element.

The magnetic field sensor array is arranged toward the encoder to measure a change, caused by the movement of the mass element, in the magnetic field vector. Further, the magnetic field sensor array has a magnet and/or a coil for magnetic field generation. The magnetic field sensor array also has at least one magnetic field sensor, whereby the magnetic field sensor is arranged between the magnet and/or the coil, on the one hand, and the encoder, on the other. It is preferred that the magnet and/or the coil are connected force-fittingly and/or by material bonding to the magnetic field sensor array. The magnetic field sensor array is integrated preferably into a semiconductor silicon substrate. It should be noted that the encoder is made preferably out of a ferromagnetic material or mu metal. Most preferably, the encoder does not generate a magnetic field; i.e., the encoder has no magnets.

An advantage of the measuring system of the invention is that the magnetic field sensor array does not co-rotate, but can be positioned at a fixed place. Tests by the applicant have shown that through the use of centrifugal force and movement of the mass element the instantaneous angular velocity can be detected nearly without latency, also when no information on the current rotation angle is available.

According to an embodiment, the magnetic field sensor array is arranged offset toward the encoder in the axial direction.

It is provided in an embodiment that the magnetic field sensor array has a first magnetic field sensor for measuring a first component of the magnetic field vector in a first spatial direction and a second magnetic field sensor for measuring a second component of the magnetic field vector in a second spatial direction and a third magnetic field sensor for measuring a third component of the magnetic field vector in a third spatial direction. Therefore, the advantage is achieved that a modulation of the magnetic field vector can be determined in all three spatial directions and can be evaluated to determine different parameters, such as the rotation angle and angular velocity.

According to a further embodiment, the evaluation circuit is set up to determine a rotation angle of the encoder from the first component and from the second component.

In an embodiment, the evaluation circuit is set up to determine an instantaneous angular velocity of the encoder from the first component and from the second component and from the third component.

Preferably, the evaluation circuit is set up to determine the instantaneous angular velocity based on an angle between the magnetic field vector and the third spatial direction. Preferably, the third spatial direction and an axis of rotation of the encoder align.

According to an embodiment, the magnetic field sensor array has a magnet and/or a coil for magnetic field generation. In this case, aging of the magnet need not be compensated.

The mass element can have a magnetically conductive and/or electrically conductive material. The magnetically conductive material is, for example, a soft magnetic material. The electrically conductive material is, for example, a short-circuit ring or a coil.

According to a further embodiment, the spring element and the linear guide of the encoder form a unit. For example, the unit comprising a spring element and linear guide is made as a compressed air cylinder, which in synergy produces both a spring force directed toward the rotation axis and guidance.

The previously described refinement variants are especially advantageous both individually and in combination. In this regard, all refinement variants can be combined with one another. Some possible combinations are explained in the description of the exemplary embodiments shown in the figures. These possible combinations of the refinement variants, depicted therein, are not definitive, however.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
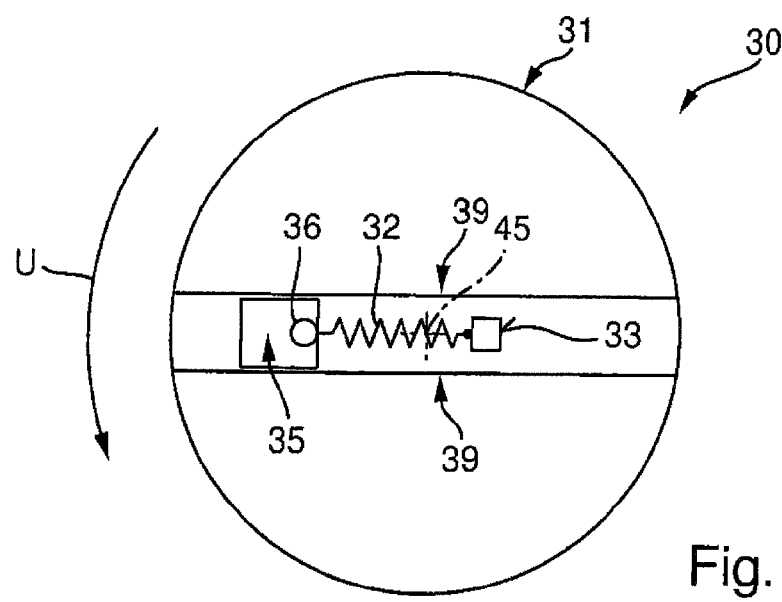
FIG. 1 shows a schematic view of an encoder.
Figure 2:
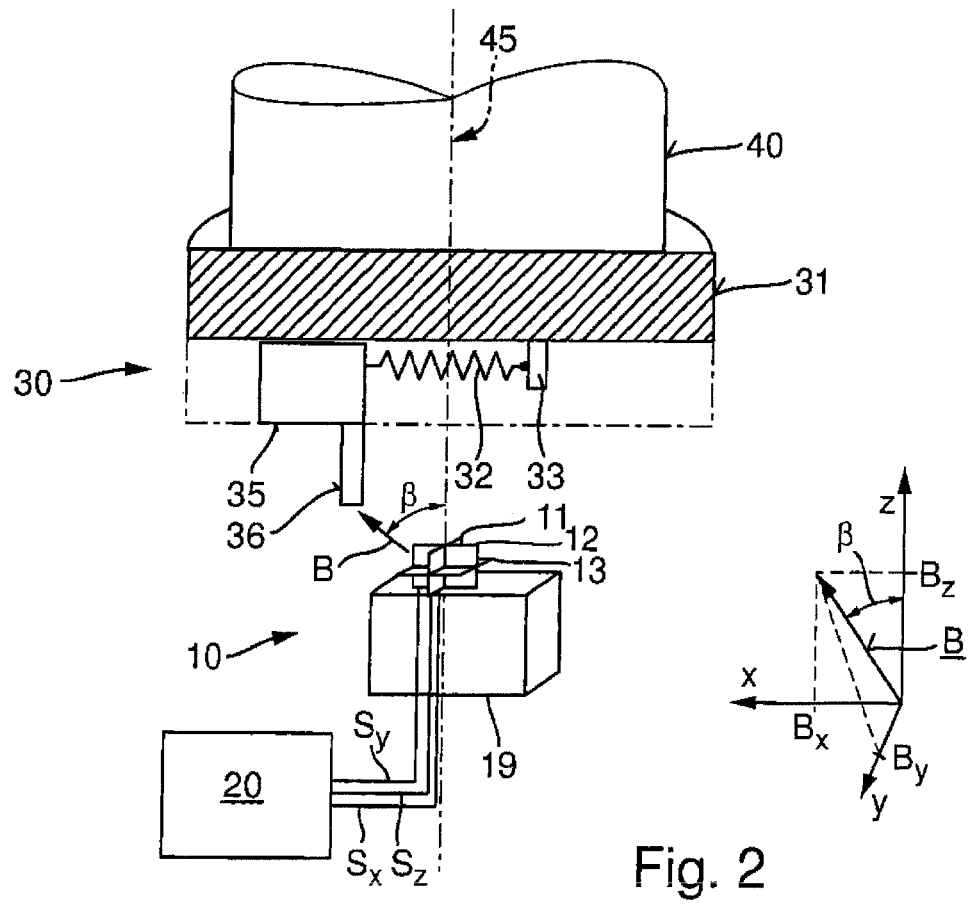
FIG. 2 shows a schematic view of a measuring system.

In FIGS. 1 and 2, a measuring system is illustrated schematically with an encoder 30 and with a magnetic field sensor array 10 and with an evaluation circuit 20. In FIG. 1, encoder 30 is illustrated schematically. Encoder 30 is rotated around axis 45. In the exemplary embodiment of FIG. 2, encoder 30 is attached to a rotating shaft 40.

The measuring system operates according to the spring-mass principle. The rotatable encoder 30 has a mass element 35 to change a magnetic field vector B in magnetic field sensor array 10. In the exemplary embodiment of FIG. 1, mass element 35 has a magnetically conductive pin 36. As an alternative to the exemplary embodiment in FIGS. 1 and 2, mass element 35 has a magnet.

Encoder 30 has a spring element 32. In the exemplary embodiment of FIG. 1, spring element 32 is a spiral spring. Mass element 35 is attached to spring element 32. Spring element 32 in the exemplary embodiment of FIG. 1 is attached, moreover, with an end opposite to mass element 35 at an attachment point 33 of a support 31 of encoder 30.

Encoder 30 has a linear guide 39. Linear guide 39 is realized, for example, by a linear slide bearing or a linear ball bearing. Linear guide 39 has the effect that mass element 35 can move only with one degree of freedom. In addition, mass element 35 rotates as part of encoder 30. In so doing, mass element 35 is guided in the radial direction in linear guide 39 in such a way that during rotation of encoder 30 mass element 35 can be moved by the centrifugal force $F_c$ and centrifugal force $F_c$ works against the spring force $F_s$ of spring element 32.

Here, the following applies:

$$F_c = m\omega^2/r = F_s = dk \qquad (1)$$

In this case, m is the mass of mass element 35, $\omega$ is the angular velocity, r is the distance of the center of mass of mass element 35 to the rotation axis 45, d is the change in length of spring element 32, and k is the spring constant of spring element 32. In this case, the distance r and the change in length d depend on one another. If in the relaxed state of spring element 32 the center of mass of mass element 35 lies on the rotation axis 45, the following applies:

$$r = d \qquad (2)$$

And the following applies for this case:

$$\omega = \sqrt{(r^2 k/m)} = r\sqrt{(k/m)} \qquad (3)$$

Therefore, the distance r is proportional to the angular velocity $\omega$. Depending on the desired measuring range, the distance r and the change in length d can differ from one another. For example, spring element 32 is slightly pretensioned.

FIG. 2 shows encoder 30, attached to the end face of a shaft 40, in a schematic cut-away three-dimensional illustration. Likewise, magnetic field sensor array 10 is shown in a three-dimensional illustration. Magnetic field sensor array 10 has a first magnetic field sensor 11 for measuring a first component $B_x$ of magnetic field vector B in a first spatial direction x and a second magnetic field sensor 12 for measuring a second component $B_y$ of magnetic field vector B in a second spatial direction y and a third magnetic field sensor 13 for measuring a third component $B_z$ of magnetic field vector B in a third spatial direction z.

First magnetic field sensor 11 and second magnetic field sensor 12 and third magnetic field sensor 13 are integrated together on a semiconductor chip. In addition, evaluation circuit 20 can also be integrated on the semiconductor chip. The coordinate system, shown in FIG. 2, with magnetic field vector B and components $B_x$, $B_y$, $B_z$ of magnetic field vector B has its origin in the middle of magnetic field sensors 11, 12, 13 but is shown offset in FIG. 2 for greater clarity.

In the exemplary embodiment of FIG. 2, magnetic field sensor array 10 moreover has a magnet 19 for generating a magnetic field, whereby the magnetic field lines of the magnetic field of magnet 19 penetrate magnetic field sensors 11, 12, 13. In this case, magnetic field sensors 11, 12, 13 are arranged between magnet 19 and encoder 30.

The magnetic field is influenced by the magnetically conductive pin 36 of mass element 35 and thus the associated magnetic field vector B detected by components $B_x$, $B_y$, $B_z$ is changed. To determine components $B_x$, $B_y$, $B_z$, magnetic field sensors 11, 12, 13 are connected to evaluation circuit 20. Evaluation circuit 20 is set up to evaluate measurement signals $S_x$, $S_y$, $S_z$ of magnetic field sensors 11, 12, 13.

As explained hereafter, magnetic field sensor array 10 is arranged toward encoder 30 for measuring a change in magnetic field vector B, said change being caused by the movement of mass element 35.

The magnetic field vector B and thereby the angle β between magnetic field vector B and rotation axis 45 can be determined by the three components $B_x$, $B_y$, $B_z$. In the exemplary embodiment of FIG. 2, rotation axis 45 and spatial direction z align. Alternatively, the angle between magnetic field vector B and the plane of the spatial directions x and y can also be determined. Evaluation circuit 20 is designed to determine the angular velocity ω from the angle β. As a result, the instantaneous angular velocity ω can be output directly. No latency arises, as occurs due to other measuring methods, e.g., during the determination of the change in angle per time interval. Therefore, a value for the instantaneous angular velocity ω can be output immediately at the start of the measuring system. An array of magnetic field sensor array 10 co-rotating with shaft 40 is not necessary.

Evaluation circuit 20 is set up to determine the instantaneous rotation angle φ from the components $B_x$ and $B_y$. For example, the following applies:

$$\varphi = \arctan(B_x/B_y) \quad (4)$$

Evaluation circuit 20 has, for example, a processor for evaluating, for example, a number of analog-to-digital converters and an evaluation logic.

The invention is not limited to the shown embodiment variants in FIGS. 1 and 2. For example, departing from the exemplary embodiments of FIGS. 1 and 2, it is possible that the mass element has a magnet or a coil or a short-circuit ring. Likewise, departing from the exemplary embodiments of FIGS. 1 and 2, it is possible to provide a coil instead of magnet 19. Likewise, the magnetic field sensor array can be arranged at a distance from rotation axis 45. In order to reduce an imbalance, different from the exemplary embodiments of FIGS. 1 and 2, it is possible to use two opposite mass elements, which are connected by the spring element. Instead of a mechanical spring, a magnetic spring can also be provided as the spring element. Moreover, damping of the movement of the mass element, for example, by means of sliding friction is possible. The functionality of the measuring system according to FIG. 2 can be used especially advantageously for a crankshaft sensor or a camshaft sensor or a steering angle sensor, for example, for a forklift truck.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring system, comprising:
   a magnetic field sensor array;
   an evaluation circuit for evaluating measurement signals of the magnetic field sensor array; and
   an encoder having a linear guide and a mass element to change a magnetic field vector in the magnetic field sensor array, the encoder having a spring element, the mass element being attached to the spring element, the mass element being adapted to be guided in a radial direction in the linear guide such that during a rotation of the encoder the mass element is moved by centrifugal force and the centrifugal force works against the spring force of the spring element, and
   wherein the magnetic field sensor array is arranged along a rotational axis of the encoder to measure a three dimensional change, caused by the movement of the mass element, in a magnetic field vector determined by the interaction of the mass element and a magnet and/or a coil which generates the magnetic field, and
   wherein the magnetic field sensor array has at least one magnetic field sensor, and
   wherein the magnetic field sensor is arranged between the encoder and the magnet and/or coil.

2. The measuring system according to claim 1, wherein the magnetic field sensor array is arranged offset toward from the encoder in the axial direction.

3. The measuring system according to claim 1, wherein the magnetic field sensor array comprises:
   a first magnetic field sensor for measuring a first component of the magnetic field vector in a first spatial direction;
   a second magnetic field sensor for measuring a second component of the magnetic field vector in a second spatial direction; and
   a third magnetic field sensor for measuring a third component of the magnetic field vector in a third spatial direction.

4. The measuring system according to claim 3, wherein the evaluation circuit is configured to determine an instantaneous rotation angle of the encoder from the first component and from the second component.

5. The measuring system according to claim 3, wherein the evaluation circuit is configured to determine an instantaneous angular velocity of the encoder from the first component and from the second component and from the third component.

6. The measuring system according to claim 5, wherein the evaluation circuit is configured to determine the instantaneous angular velocity based on an angle between the magnetic field vector and the third spatial direction.

7. The measuring system according to claim 3, wherein the first component of the magnetic field, the second component of the magnetic field, and the third component of the magnetic field are all orthogonal to each other.

8. The measuring system according to claim 1, wherein the mass element has a magnetically conductive and/or electrically conductive material.

9. The measuring system according to claim 1, wherein the spring element and the linear guide of the encoder form a unit.

10. The measuring system according to claim 1, wherein the measuring system is based on the spring-mass principle.

11. The measuring system according to claim 1, wherein the encoder is rotatable.

12. The measuring system according to claim 1, wherein the mass element further includes a magnetically conductive pin extending perpendicular to the linear guide and parallel to the rotational axis of the encoder.

13. A measuring device comprising:
   a magnetic field sensor array including at least three mutually orthogonal magnetic field sensors;
   an evaluation circuit which simultaneously and instantaneously evaluates each of the measurement signals from each magnetic field sensor of the magnetic field sensor array; and
   an encoder having a linear guide and a mass element to change a magnetic field vector in the magnetic field sensor array, the encoder having a spring element, the mass element being attached to the spring element, the mass element being adapted to be guided in a radial direction in the linear guide,
   wherein the magnetic field sensor array is arranged along a rotational axis of the encoder to measure a three dimensional change, caused by the movement of the mass element, in a magnetic field vector determined by the interaction of the mass element and a magnet which generates the magnetic field, and wherein the magnetic field sensor is arranged between the encoder and the magnet and/or coil.

* * * * *